Jan. 22, 1935.  O. M. ANDERSON ET AL  1,989,034
STRAINER ASSEMBLY
Filed July 7, 1932

Inventor
Oscar M. Anderson
Fred W. Juengst

By H. Clay Lindsey
Attorney

Patented Jan. 22, 1935

1,989,034

UNITED STATES PATENT OFFICE 1,989,034

STRAINER ASSEMBLY

Oscar M. Anderson and Fred W. Juengst, New Britain, Conn., assignors to Landers, Frary & Clark, New Britain, Conn., a corporation of Connecticut Application July 7, 1932, Serial No. 621,234

3 Claims. (Cl. 210—162)

This invention relates broadly to the art of percolators, and is more particularly concerned with that type of percolator in which the steam created in the kettle forces the heated water up through a tube or spout into an upper receptacle in which the coffee material is supported on a strainer.

In percolators of this kind, the upwardly moving heated water has a tendency to dislodge the strainer assembly from its seat in the upper receptacle, and it is an object of this invention to provide an improved strainer assembly which includes improved spring means for maintaining the strainer on its seat.

Another object of the present invention is to provide an improved strainer assembly in which the means for maintaining the strainer on its seat has a relatively small surface area and, hence, there will be offered little opportunity for the lodgement of sediment thereon so that our improved strainer assembly will be clean and sanitary. Our improved strainer assembly is also adapted to be readily removed from the upper receptacle for purposes of cleaning.

A further object of the present invention is to provide an improved strainer assembly which includes means for receiving the free ends of the draw strings of the filter cloth, whereby the same may be held securely in place upon the strainer.

A still further object of the present invention is to provide an improved strainer assembly which comprises few parts of simple construction and, therefore, one which is relatively cheap to manufacture and will not readily get out of order.

Other objects will be in part obvious, and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawing, wherein is shown, for illustrative purposes, one of the embodiments which the present invention may take, Fig. 1 is a fragmentary detail of the coffee receptacle in cross section, illustrating our improved strainer assembly in position;

Figure 1:
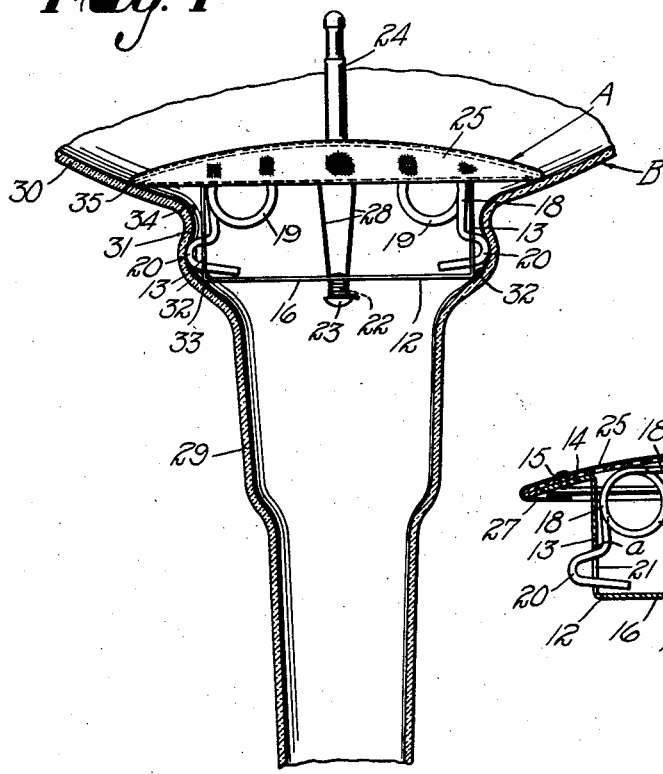

Referring more particularly to the figures, A generally indicates our strainer assembly and B generally indicates a percolator of the kind described above. In order to fully understand our invention, it is not thought to be necessary to illustrate the entire percolator, but only a portion of the upper receptacle thereof has been shown with our improved strainer assembly applied thereto.

The strainer assembly A comprises a strainer 10 which is substantially dome-shaped and is provided with a plurality of openings 11. The strainer may be made of any suitable metal, such as aluminum or the like, and has secured to the under face thereof a spring support 12 which is generally of U-shape. The legs 13 of the spring support are each provided at its free end with an out-turned ear 14 which is disposed at slightly less than a right angle to its adjacent leg 13 so as to conform to the shape of the under surface of the strainer. Each ear 14 is provided with an aperture adapted to receive a rivet 15, or the like, by means of which the spring support is secured to the strainer. The legs 13 of the spring support are disposed at substantially right angles to the under surface of the strainer and carry at their lower ends the cross piece 16 of the support.

Secured, as at 17, by means of solder or in any other suitable manner, to the under surface of the strainer, is a spring 18. This spring 18 is made from a single piece of spring wire of suitable length and is provided between each free end and the point of attachment to the strainer with a single loop 19. From each loop the spring extends downwardly, inwardly of, and substantially parallel to, its adjacent leg 13 of the spring support and each free end portion of the spring is bent upon itself to provide a shoulder 20 which is received by an opening 21 in its respective leg 13 of the spring support. The cross piece 16 of the spring support carries a depending stud 22 having an enlarged head 23. This stud may be riveted to the cross piece or secured thereto in any other manner and is disposed intermediate the ends of the cross piece 16.

The strainer is provided with an upstanding handle 24 having a head 24' and which is secured to the strainer centrally thereof by means of soldering or the like.

A filter cloth 25 is supported upon the upper surface of the strainer and is provided with a centrally disposed opening 26 which is adapted to be threaded over the handle 24 of the strainer. The filter cloth is provided with an annular marginal folded over portion 27 which is adapted to engage the peripheral edge and the marginal under surface of the strainer. The filter cloth is also provided with the usual draw string 28 the free ends of which are adapted to be received by the shank of the stud 22 from which they are prevented from slipping by the enlarged head 23 of the stud.

The receptacle B is provided with a funnel 29 and a bowl portion 30 which are joined together by means of a neck 31. The neck 31 is provided with an internal annular groove 32. Disposed beneath this groove, the neck is provided with an internal annular shoulder 33, and above the groove it is provided with an internal annular cam surface 34. The bowl 30 is provided with a bottom which provides an annular seat 35 upon which the strainer is adapted to engage when the strainer assembly is in position.

Figure 2:
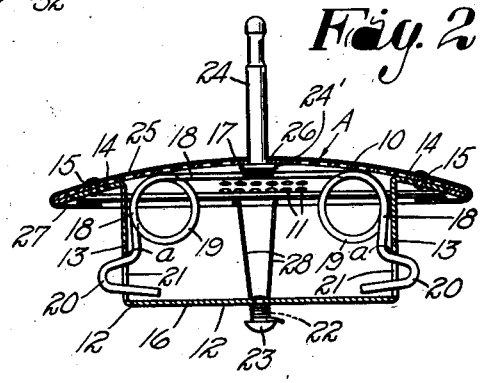
Fig. 2 is an enlarged view partly in section and partly in elevation of our improved strainer assembly.
Figure 3:
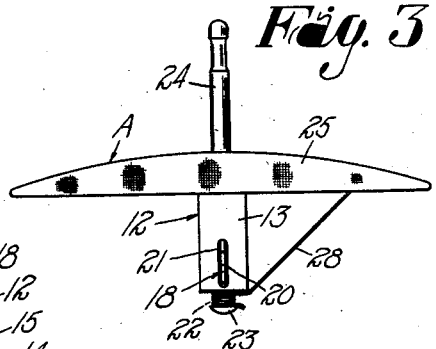
Fig. 3 is a side elevation of the same.
Figure 4:
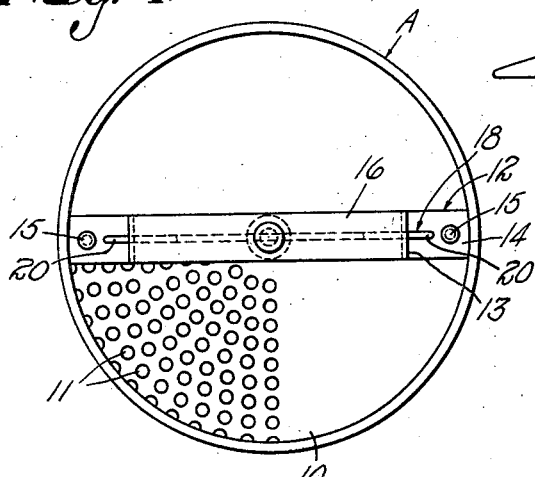
Fig. 4 is a bottom plan view of the same.

In the operation of the device, the filter cloth 25 is placed upon the strainer 10 with the folded portion 27 engaging the under face of the strainer, and the draw strings are then drawn taut and secured to the shank of the stud 22. The handle 24 is then grasped by the user and the strainer assembly is then passed through the opening at the top of the receptacle B and lowered into the position shown in Fig. 1. As the device is lowered, the shoulders 20 on the spring, which are normally disposed outwardly of the legs 13 (as shown in Fig. 2) come into contact with the surface 34 of the receptacle B and are cammed inwardly thereby so that the device may be further lowered until the strainer and filter have come to rest upon the seat 35 of the receptacle B. At this time, the shoulders 20 of the spring, freed of the force exerted upon them by the cam surface 34, will, due to the resiliency of the spring, snap into the groove 32. The parts will now be in the position shown in Fig. 1 and will remain in this position since the shoulders 20, under the resiliency of the spring 18, will remain in the groove 32 against the force of the upwardly moving heated water. Rocking of the device will be prevented since the spring urged shoulders 20 pull the strainer down upon its annular seat 35. To remove the device, the user simply grasps the handle 24 and pulls upwardly thereon, whereupon the cam surface 34 cams the shoulders 20 inwardly and the device is free to be withdrawn.

It will be noted that the shoulders 20 of the spring are guided in their movements by the openings 21 in the legs 13 and that the upper wall of each opening engages its shoulder 20, as at $a$, when the shoulders are in their normal outward position, as shown in Fig. 2, to limit the outward movement of the shoulders 20.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

We claim as our invention:

1. The combination with a coffee receptacle having an internal groove, of a self-contained strainer assembly including a strainer, a spring support carried by said strainer and having a pair of opposed legs with diametrically opposite openings therein, and a spring carried by said strainer and disposed between said openings, said spring having a pair of shoulders respectively movably received in said openings and adapted to engage in said groove, said legs being adapted to limit the outward movement of said shoulders.

2. In combination, a coffee receptacle having an internal annular groove and an internal annular seat spaced above said groove, and a self-contained strainer assembly comprising a strainer adapted to engage said seat, a spring support having opposed legs with openings therein, and a spring fixed to said strainer and disposed between said legs and having shoulders respectively received and guided by said openings in said legs, said shoulders adapted to engage in said groove.

3. A self-contained strainer assembly comprising a strainer, a filter on said strainer and having draw strings, a spring fixed to said strainer and having depending arms provided with shoulders, a U-shaped support depending from said strainer and guiding the arms of said spring in their movements and also limiting the outward movement of said arms, and a stud carried by said support and adapted to have said draw strings secured thereto.

OSCAR M. ANDERSON.
FRED W. JUENGST.